(12) United States Patent
Balko et al.

(10) Patent No.: US 8,904,343 B2
(45) Date of Patent: Dec. 2, 2014

(54) ADDING SERVICES TO APPLICATION PLATFORM VIA EXTENSION

(75) Inventors: Soeren Balko, Weinheim (DE); Juergen Kissner, Bad Schoenborn (DE); Tobias Breyer, Heidelberg (DE); Philipp Sommer, Heidelberg (DE); Patrick Schmidt, Heidelberg (DE); Harald Mueller, Boeblingen (DE)

(73) Assignee: SAP SE, Walldorf (DE)

( * ) Notice: Subject to any disclaimer, the term of this patent is extended or adjusted under 35 U.S.C. 154(b) by 1226 days.

(21) Appl. No.: 12/642,890

(22) Filed: Dec. 21, 2009

(65) Prior Publication Data

US 2011/0154302 A1  Jun. 23, 2011

(51) Int. Cl.
  *G06F 9/44* (2006.01)
  *G06Q 10/06* (2012.01)
(52) U.S. Cl.
  CPC . *G06F 8/10* (2013.01); *G06Q 10/06* (2013.01)
  USPC .......................................... 717/104; 717/163
(58) Field of Classification Search
  USPC .................................................. 717/104, 163
  See application file for complete search history.

(56) References Cited

U.S. PATENT DOCUMENTS

| 6,061,692 A * | 5/2000 | Thomas et al. ............... 707/613 |
| 2004/0187140 A1* | 9/2004 | Aigner et al. ................. 719/328 |
| 2006/0184925 A1* | 8/2006 | Ficatier et al. ................ 717/163 |

* cited by examiner

*Primary Examiner* — Li B Zhen
*Assistant Examiner* — Duy Khuong Nguyen

(57) ABSTRACT

Systems and methods for adding services to an application platform via an extension platform coupled to the application platform. The application platform runs in a first operation system process and provides a number of resources. The extension platform is implemented in a second operation system process and communicates with the application platforms via standard inter-process communication protocols. The extension platform provides an environment to dynamically model and host application services. A resource abstraction layer provides the extension platform with access to the resources provided at the application platform. The resources are utilized by the extension platform to design and to execute the application services. The application services hosted in the extension platform are centrally managed and administered from the application platform via exposed interfaces.

20 Claims, 8 Drawing Sheets

ADDING SERVICES TO APPLICATION PLATFORM VIA EXTENSION

TECHNICAL FIELD

The field of the invention relates generally to data processing and digital processing systems. More specifically, the invention is related to providing application services within a computer systems environment.

BACKGROUND

Business applications are traditionally implemented on top of online transaction processing (OLTP) application platforms. Such OLTP-oriented application platforms are built to be robust and reliable, and provide a variety of infrastructure services, e.g., user interfaces, report generation, business object repositories, software logistics and lifecycle management, persistency abstraction, etc. Typically, application platforms providing business services evolve slowly, over long periods of times. Many of these platforms are developed with proprietary programming languages or by different vendors, which makes them less flexible to add new functionality without extensive coding. In effect, OLTP-oriented application platforms are ideally tailored to the needs of end-user application implementations, but are less suited to provide open integration services for dynamic development and integration of new application services.

For example, business software vendor company SAP AG offers SAP Business Suite™ that is developed using Advanced Business Application Programming™ (ABAP™) language. SAP Business Suite™ provides an application platform for self contained business applications, e.g. enterprise resource planning (ERP), customer relationship management (CRM), human capital management (HCM), etc. However, SAP Business Suite™ does not support generic integration, composition or extensibility hubs, like Business Process Management (BPM) service, Enterprise Service Bus (ESB) service, etc. Instead, SAP AG offers SAP Composition Environment™ on Java™ application platform to provide infrastructure services (BPM, ESB, etc.) that act as open orchestration and collaboration layers to dynamically model business processes, and design and provide new business services.

Often, private computing environments are configured with two separate application platforms. One of the application platforms is required for the traditionally coded business applications that are utilized for running the business of a company. The other application platform provides an environment for dynamic modeling and support of new business processes. To install, setup, run and maintain two separate application platforms is inefficient and expensive. This is so at least because the two platforms use separate software lifecycle management tools and duplicated administration efforts, without sharing resources and exposing different usage paradigms.

SUMMARY

Systems and methods for adding services to an application platform via an extension platform coupled to the application platform are described. In one aspect, the application platform is run in a first operation system process and provides a number of resources, including applications and infrastructure services, e.g., user interfaces, user management and security, data locking and mapping infrastructure, software logistic mechanism, etc. In a further aspect, the extension platform is implemented in a second operation system process and communicates with the application platforms via standard inter-process communication protocols. The extension platform provides environment to dynamically model and host application services. In yet another aspect, a resource abstraction layer provides the extension platform with access to resources provided by the application platform, where the resources are used to design and to execute the hosted application services. In one other aspect, the extension platform exposes interfaces to enable management and administration of the hosted application services from the application platform.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for adding services to application platform via extension are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
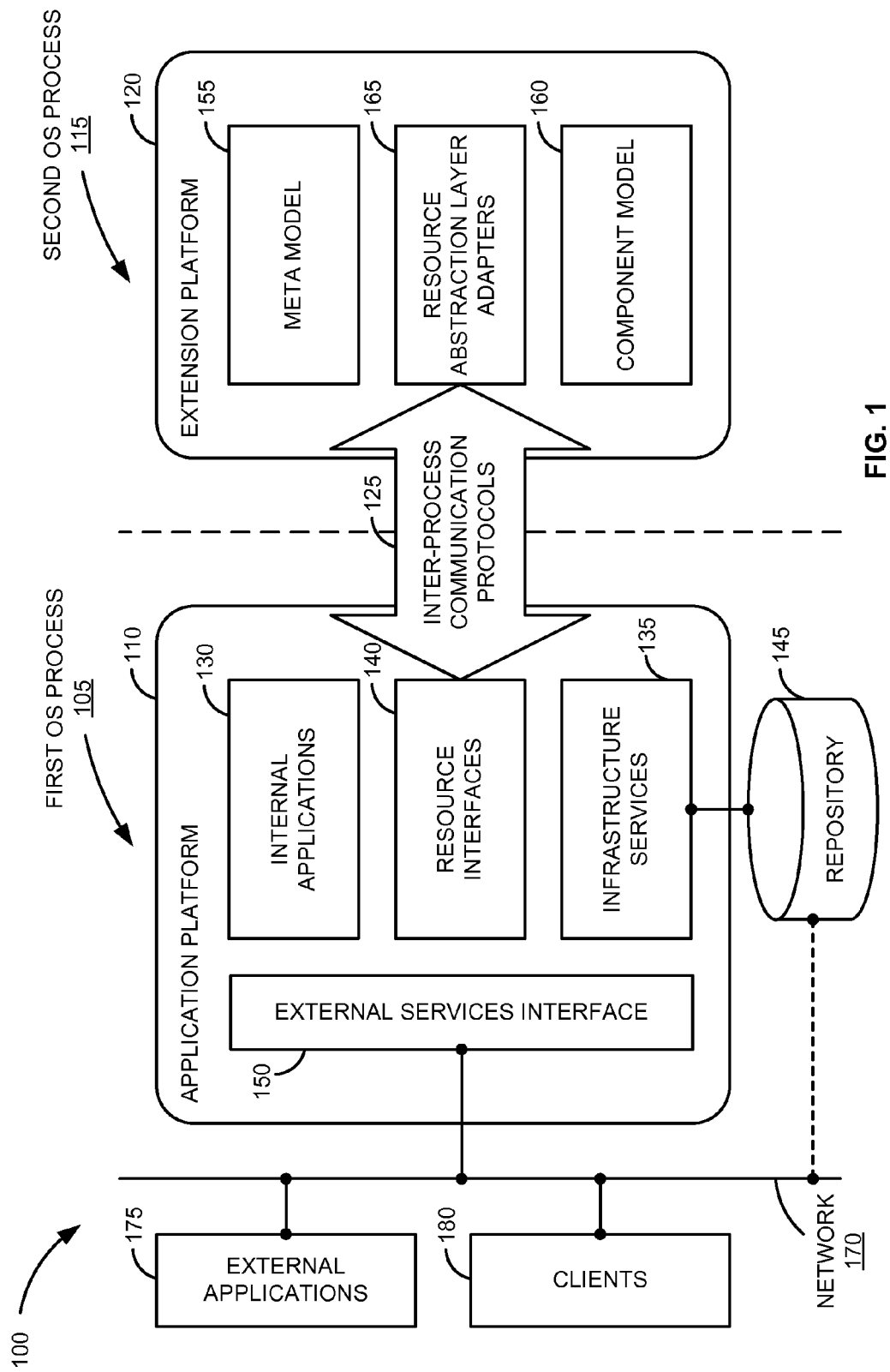
FIG. 1 is a block diagram of a computer system where an extension platform is coupled to an application platform to provide additional application services, according to one embodiment of the invention.

FIG. 1 shows a block diagram of computer system 100 where application platform 110 is running in first operation system (OS) process 105. In a second OS process 115 extension platform 120 is implemented. The first OS process 105 and the second OS process 115 could be separate threads in one operation system; or separate OS processes in separate OS installations, including in separate installations of different operation systems. According to one embodiment of the invention, extension platform 120 provides functionality to model new business processes, and to design and run new application services, respectively. Meta model 155 represents the various process model entities, e.g., processes, tasks, data types, interfaces, etc. Component model 160 represents business process models in terms of software components and interdependencies between the components.

In order to minimize duplicated software installation and administration, extension platform 120 shares a number of resources with application platform 110. Resource abstraction layer 165 is presented in extension platform 120 to access resources provided by application platform 110. Resource abstraction layer 165 could include a number of adapters corresponding to resources in application platform 110. The shared resources could be any of internal applications 130 running on application platform 110, infrastructure services 135, and external applications 175 connected to application platform 110 via network 170. Infrastructure services 135 refer to basic or fundamental resources of application platform 110, also called system resources. An exemplary non-exhaustive list of resources provided by infrastructure services 135 that are shared by extension platform 120 and application platform 110 could include:

locking service to regulate competitive access to shared objects;
user management service;
user authentication service;
task management mechanism;
process management mechanism for business process management and administration;
data mapping infrastructure for data transformation and expressions evaluation;
event hub for receiving and sending system and application events;
database access infrastructure;
repository access;
remote function call (RFC) infrastructure;
business object (BO) dispatcher proxy for making calls into business objects;
software logistics mechanism;
cluster management; etc.

Resource abstraction layer adapters 165 of extension platform 120 access the corresponding resources in application platform 110 through the existing resource interfaces 140. Occasionally, development of a new interface for a particular resource in application platform 110 could be required to provide access for the corresponding adapter in extension platform 120. Extension platform 120 exposes additional interfaces through resource abstraction layer adapters 165 to allow resources of application platform 110 to manage and administer the application services hosted by extension platform 120. The communication between resource abstraction layer adapters 165 and resource interfaces 140, is organized via inter-process communication protocols 125. Respectively, system 100 does not require any additional development of proprietary channels for data exchange between the platforms. Instead, well established mechanisms are reused, e.g., RFC, remote method invocation (RMI), including industry standard protocols like Wf-XML (Workflow Extensible Markup Language) developed by "Workflow Management Coalition", WS (Web Services) Human Task, etc.

Application platform 110 communicates with external applications 175 and clients 180 through external services interface 150 via public or private network 170. Typically, external applications 175 provide services required from within application platform 110, and clients 180 request services provided by application platform 110. Repository 145 could store business process models, executable software components, and persist execution context for the application services provided by application platform 110. Additionally, repository 145 could be fully or partially reused as a resource by extension platform 120. Repository 145 could be accessed through network 170 as an external resource instead of being partly or directly connected to application platform 110.

Figure 2:
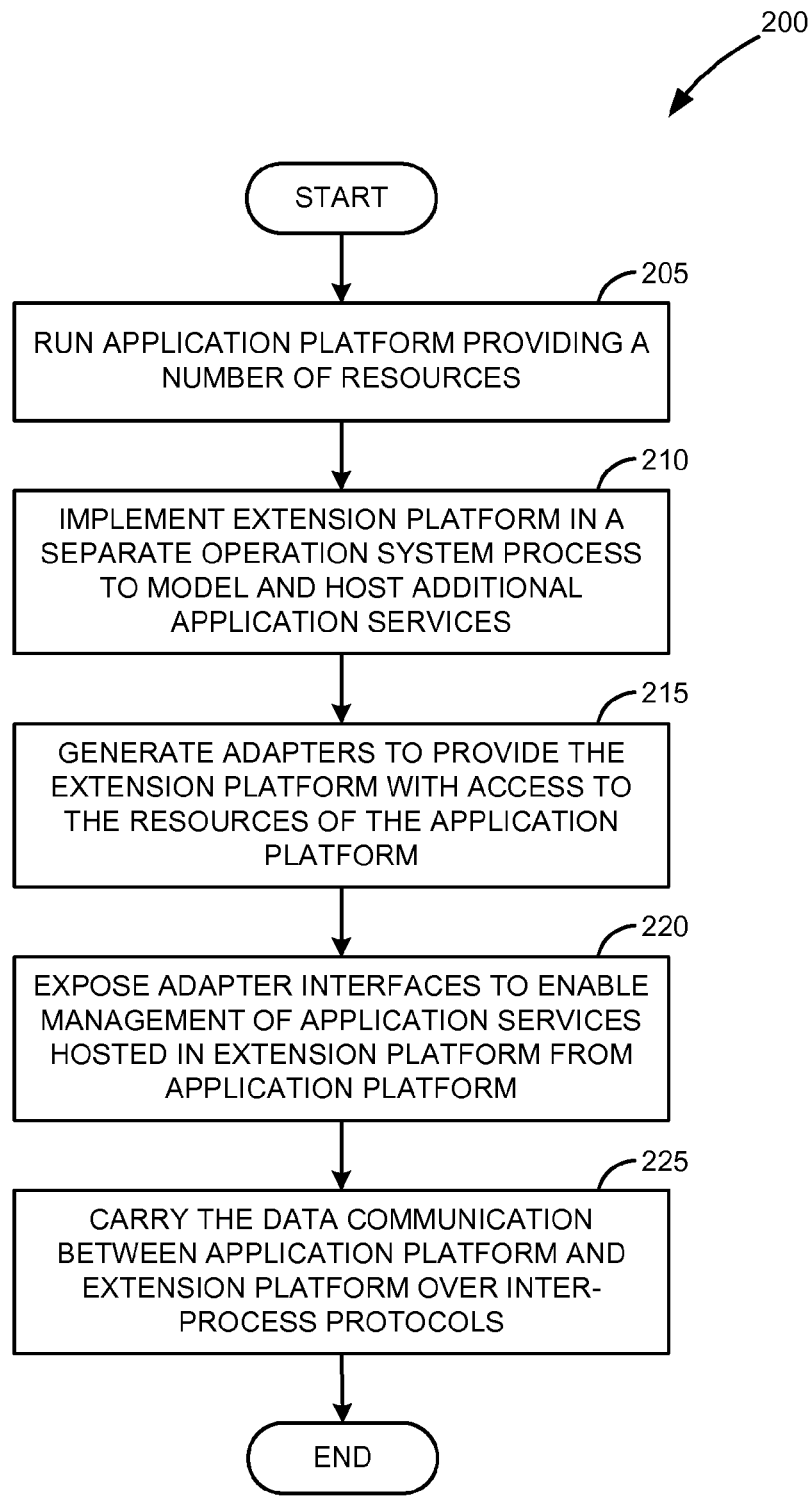
FIG. 2 illustrates a process for setting up a computing environment including an extension platform coupled to an application platform to provide additional application services, according to one embodiment of the invention.

FIG. 2 shows a process 200 for setting up a computing environment including an extension platform coupled to an application platform to provide process modeling and to host additional application services, according to one embodiment of the invention. At 205, application platform is run to provide a number of resources as application services hosted by the application platform, system services, external application services, various user interfaces, etc. Application platform is tailored for the needs of proprietary or specifically developed business applications. Usually, adding new application services, or changing the existing application services would require massive development and prolonged offline setup and test periods.

An extension platform is implemented in a separate operation system process at 210. The extension platform provides means for dynamically modeling new business processes, tools to easily design new application services, and an execution environment to host and execute the designed application services. To avoid duplicate management and administration efforts, the implemented extended platform does not include all features that are typical for a standalone installation. Only a minimum set of internal resources are implemented, where the minimum set includes resources that are not provided by the application platform, or cannot be shared between the two platforms.

At 215, a number of adapters are generated to provide the extension platform with access to the shared resources available at application platform. When a process running in the extension platform requests a specific service, a corresponding adapter intercepts the request. Thus, instead of providing the service from a resource within the extension platform, the request is routed to the application platform. Furthermore, extension platform need not provide its own resources, including the hosted application services, which cannot be managed centrally from the application platform. Accordingly, at 220, the extension platform exposes one or more adapter interfaces corresponding to the internal resources that allow management of the resources from the application platform. To avoid additional development of communication channels, the adapters generated at 215, and the interfaces exposed at 220 could carry the data exchange between the platforms through standard inter-process communication protocols at 225.

Figure 3:
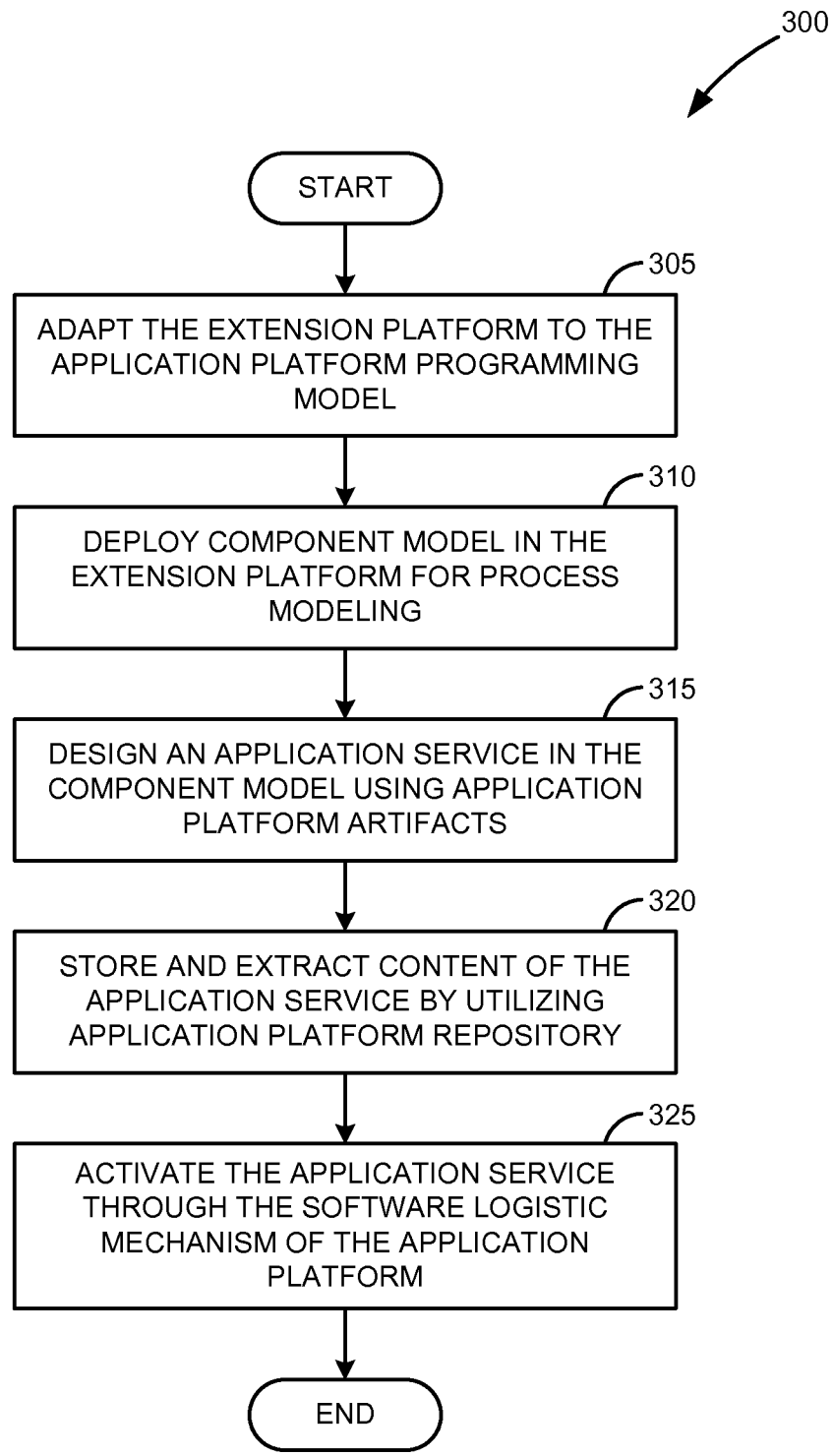
FIG. 3 illustrates a process for designing additional business application services at an extension platform coupled to an application platform, according to one embodiment of the invention.

FIG. 3 shows process 300 for designing additional business application services at an extension platform coupled to an application platform, according to one embodiment of the invention. One of the advantages to couple together an extension platform and an application platform is to avoid duplicated efforts for management and administration of the two platforms. Accordingly, the extension platform should reuse as many of the resources provided by the application platform on all levels as feasible. The different levels correspond to the purposes of the extension platform, e.g., process modeling, application services hosting, etc.

At 305, the extension platform implemented in a separate OS process is adapted to the programming model of the application platform. Application platforms and extension platforms are often built by different vendors using different software languages. The adaptation of the extension platform to the programming model of the application platform could mean introducing additional requirements to a meta model or to a component model of the extension platform. Such additional requirements could entail defining data types, providing interfaces, imposing new activity types for business object interactions, reusing parts of process models predefined in the application platform, etc.

At 310, a component model is deployed in the extension platform. There are a variety of component models that could be used for process modeling. For example, OSGi Alliance (formerly known as the Open Service Gateway Initiative) has specified a Java™-based service platform providing a component model for dynamically creating or changing application services. Vendor specific component models, like the component model provided by the SAP NetWeaver™ Development Infrastructure (NWDI), could also be deployed in the extension platform.

At 315, a new application service is designed within the component model. The component model deployed in the extension platform uses modeling tools that browse and retrieve artifacts from the application platform to be used in the process model of the newly created application service. This approach ensures compatibility between the new application service and the available resources at the application platform. A non-exhaustive exemplary list of applicable artifacts includes a business object, a data type, a user interface, a workflow, an application program interface (API), an event, etc. The process modeling could be organized in different projects, where each project represents a modeling environment within the component model for creating a business process workflow to provide a specific application service.

The process model (e.g., the business process workflow) of the newly designed application service is stored as process content in a repository at the application platform at 320. The process content includes the artifacts and the defined interdependencies of the process model. Process content stored in the repository could be extracted or fetched by the component model for further analysis and changes. The repository is an example of a resource provided by the application platform and reused by the extension platform. Another shared resource could be used to activate the new application service at the extension platform. At 325, the software logistics mechanism of the application platform is utilized to compile and deploy the process content of the new application service. The executable code of the process content, together with the corresponding execution context could also be stored in the repository at the application platform. The compile and deploy services provided by the software logistics mechanism of the application platform could be accessed from the extension platform through corresponding resource adapters.

Figure 4:
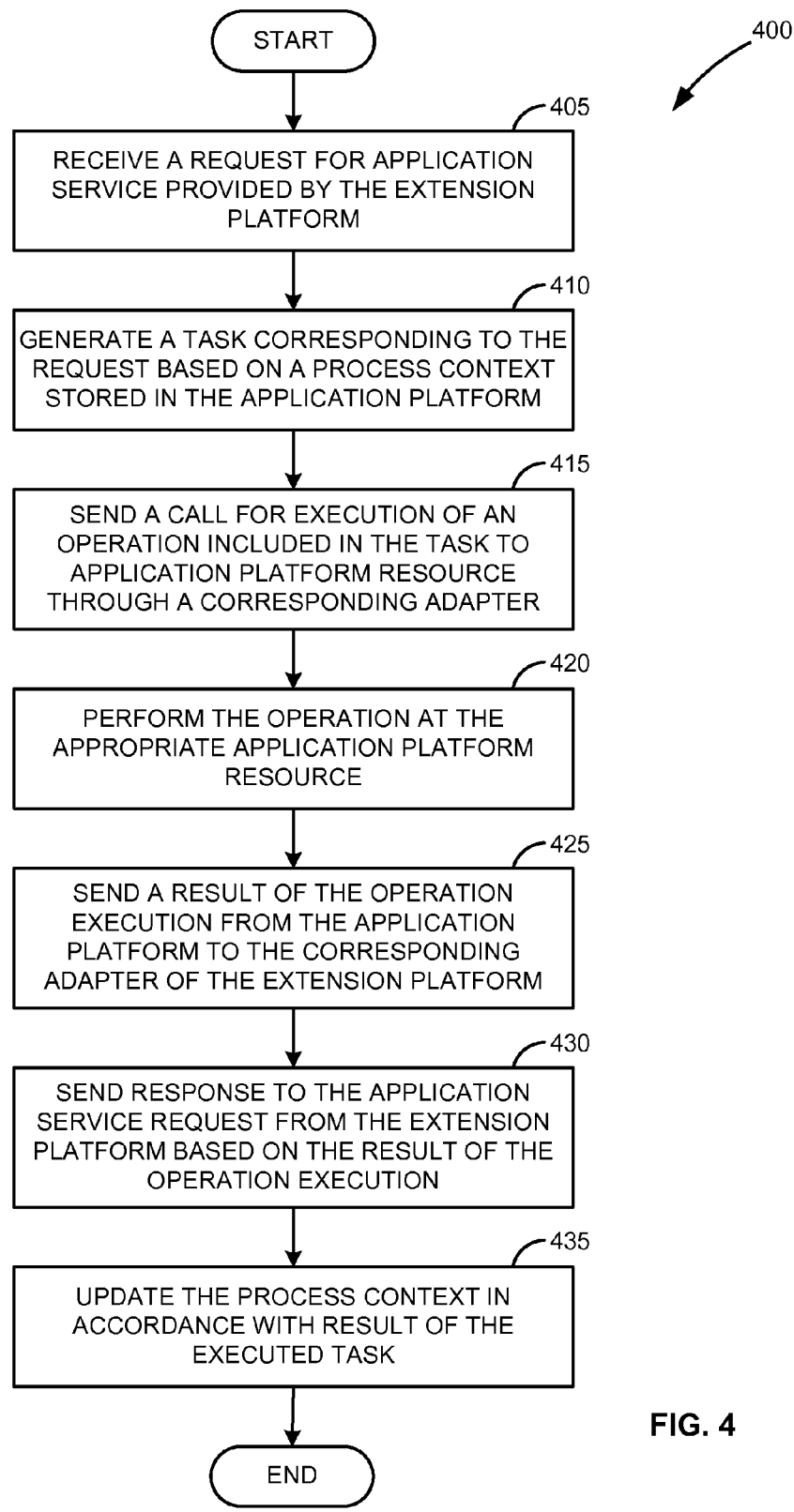
FIG. 4 illustrates a process for executing an application service hosted by an extension application platform coupled to an application platform, according to one embodiment of the invention.

FIG. 4 shows process 400 for executing an application service hosted by an extension application platform coupled to an application platform, according to one embodiment of the invention. At 405, a request regarding the application service provided by the extension application is received. The request could originate from an application that is part of the computing environment where extension and application platforms are running. The request could be also received from an external application or from a customer via a private or public computer network. The extension platform runs the application service in a local workflow engine that accesses the deployed components of the underlying business process. The workflow engine reuses some of the resources provided by the application platform, including user interfaces, and internal and external applications. Respectively, the application service hosted in the extension platform could be notified about the request by an event sent through one of a number of adapters generated in the extension platform to access shared resources.

At 410, a task is generated corresponding to the event as identified at the extension platform. The task is a part of the application service, and when executed changes the execution status of the underlying business process as requested. Extension platform could extract data about the process context of the application service from a repository provided by the application platform to generate the task. The process context contains information about the execution status of the application service, including parameters values, data mappings, etc.

The generated task could include operations associated with one or more artifacts of the underlying business process, provided by the application platform. At 415, a call for executing an operation of the task is sent to an appropriate resource of the application platform via a corresponding resource adapter. For example, the generated task could require a change of information in a business object (BO) provided in the application platform. The relevant update operation is routed from the workflow engine of the extension platform to a business object repository resource at the application platform via a business object adapter part of the resource abstraction layer.

At 420, the operation that is sent for execution to the application platform is performed by the appropriate resource or service provided at the application platform. At 425, a result indicating the execution of the operation is sent back to the extension platform via the corresponding resource adapter. Alternatively, the result could be sent through another adapter or interface exposed by the extension platform, or no result is sent. Based on the result of the operation execution, at 430, a response to the request received at 405 is prepared and sent from the extension platform. The response could be sent in the form of an event indicating a successful or unsuccessful accomplishment of the generated task. When the task is successfully accomplished, the process context of the application service is updated in accordance with the result of the executed task through the corresponding adapter at 435.

Figure 5:
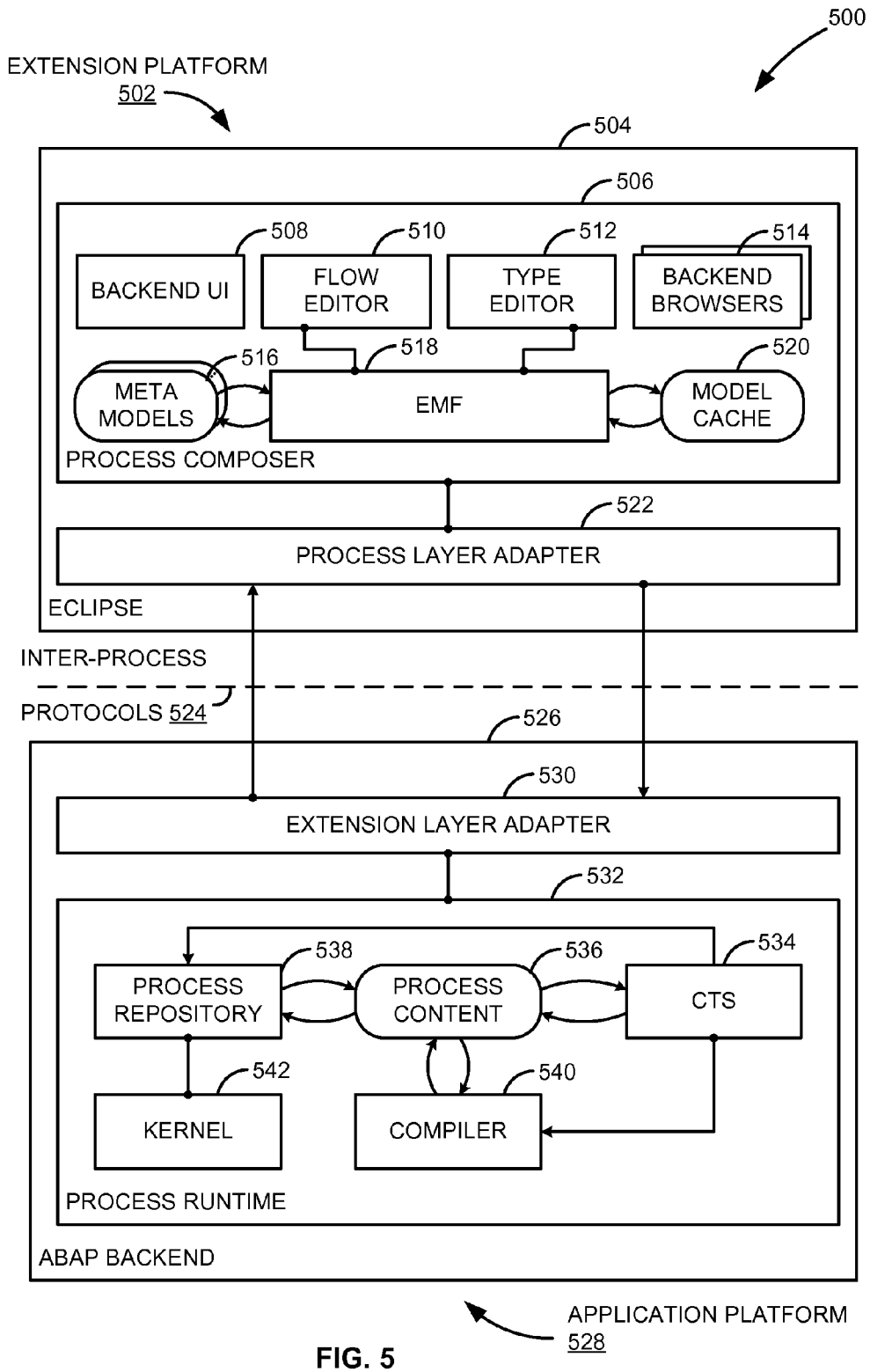
FIG. 5 is a block diagram of a computing environment for designing additional application services, according to one embodiment of the invention.

FIG. 5 shows a block diagram of a computing environment 500 for business processes design where extension platform 502 is coupled with application platform 528, according to one embodiment of the invention. Extension platform 502 includes design environment 504, and application platform 528 includes backend 526 where software logistics mechanism is provided. For example, design environment 504 could integrate Eclipse™ software development environment provided by the open source software community and backend 526 could be the ABAP application platform provided by SAP AG. The two coupled platforms run in separate operation system processes. Design environment 504 and backend 526 communicate through adapters 522 and 530 via standard, or industry recognized, inter-process communication protocols 524. In one embodiment of the invention, the design environment 504 of the extension platform 502 could run in a remote environment, and could communicate with the backend 526 via remote connection protocols, e.g., Hypertext Transfer Protocol (HTTP).

Adapter 522 is a dedicated process layer enabling process composer 506 to access process runtime 532. Respectively, adapter 530 is an extension layer enabling process runtime 532 to access process composer 506. Process definitions could be exported from backend 526 to design environment 504 through adapters 522 and 530, and vice versa. For example, once the process definitions are extracted they are cached in model cache 520. Eclipse modeling framework (EMF) 518 could access process definitions in both model cache 520 and meta models 516, and use them to design process workflows with the help of flow editor 510 and type editor 512. Backend browsers 514 are tools that enable searching for supported artifacts that are provided or supported at backend 526. Backend user interface (UI) 508 integrates the existing UIs at backend 526 with design environment 504 to avoid introduction of new UIs dedicated only to process modeling.

At backend 526, process definitions are stored in process repository 538. Process repository 538 could store activated process definitions as well. The process definitions are activated by compiling them with compiler 540 to executable format that could be processed by kernel 542. Process content 536 stores changes to the process definitions. The changes to the process definitions could be received via change and transport system (CTS) 534 from design environment 504 or from another development service. In one embodiment of the invention, extension platform 502 could host compiler 540 or kernel 542, or both, to compile or/and execute the process definitions.

Figure 6:
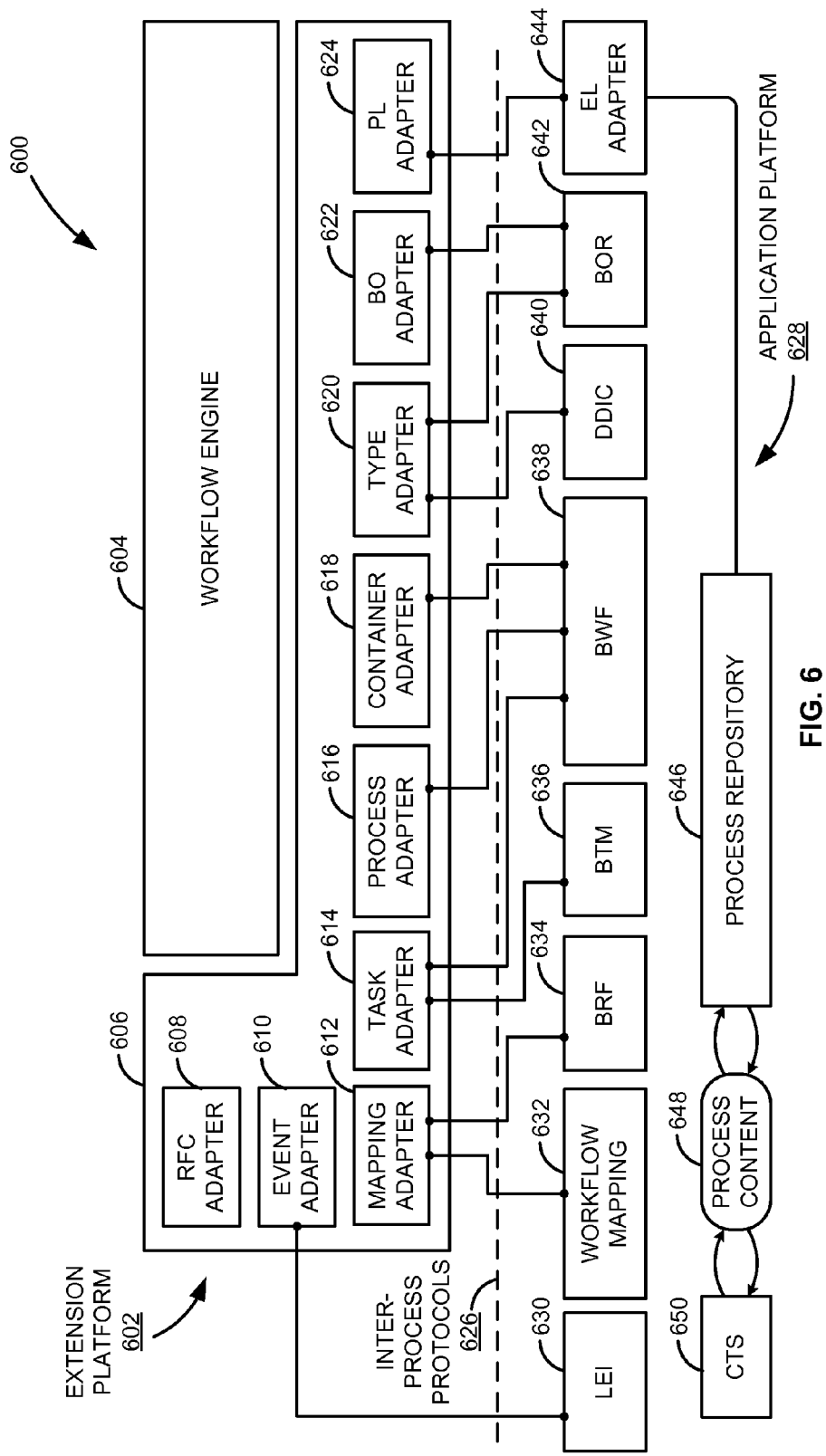
FIG. 6 is a block diagram of a computing environment for providing additional application services, according to one embodiment of the invention

An example embodiment of the invention is illustrated with the block diagram shown in FIG. 6. In computing environment 600, extension platform 602 is coupled to application platform 628. Application services hosted by extension platform 602 are executed at workflow engine 604 by reusing a number of resources provided at application platform 628. This technique avoids duplicated costs for management and administration of duplicated resources. The advantage is proportional to the number of the resources that the coupled platforms share. Extension platform 602 and application platform 628 are implemented and run in separate processes of an operation system, or in separate operation systems. As FIG. 6 shows, extension platform 602 communicates with the resources provided at application platform 628 through the adapters included in resource abstraction layer 606 via inter-process protocols 626.

Resource abstraction layer 606 includes remote function call (RFC) adapter 608 to enable remote function calls and remote method invocations between the platforms. RFC adapter 608 could facilitate the communication between one or more of the rest of the adapters in the resource abstraction layer 606 with the respective resources at application platform 628. Event adapter 610 receives application service requests from internal or external services provided at application platform 628. For example, event adapter 610 could access Local Event Infrastructure (LEI) interface 630 present at application platform 628. LEI 630 acts as a central infrastructure for different events that arise at an application backend, and a public interface which translates those events into Web Service calls to registered event consumers. In other words, LEI 630 helps to receive outbound events (e.g. from an external application) regarding services hosted by extension platform 602.

Mapping adapter 612 connects extension platform 602 with workflow mapping 632 and business rule framework (BRF) 634 resources provided at application platform 628. Generally, the BRF 634 is a runtime environment for processing of certain rules. The correspondence between the business rules and a specific business process is provided by workflow mapping 632. The data mapping infrastructure of application platform 628 represented with resources workflow mapping 632 and BRF 634 provides functionality to workflow engine 604 of extension platform 602 for data transformations and expression evaluations.

Task adapter 614 connects workflow engine 604 with business task management (BTM) 636 and with business workflow infrastructure (BWF) 638 resources. The tasks of the application services running in workflow engine 604 could be managed and monitored through BTM 636 service. The tasks could be organized and added or extracted from an inbox through BWF 638 via task adapter 614. BWF 638 could also be used for managing the execution of the processes corresponding to the hosted application services in extension platform 602 via process adapter 616. Furthermore, BWF 638 could store process context for the application services running in workflow engine 604 in a workflow container. Workflow engine 604 extracts and updates the relevant process context at BWF 638 via container adapter 618.

An application service hosted in extension platform 602 sends various operations for execution by appropriate resources provided at application platform 628. Workflow engine 604 has to instantiate a number of operation specific variables and parameters based on the meta models of the execution environments provided at the application platform 628. Type adapter 620 connects extension platform 602 with data dictionary (DDIC) 640 and business objects repository (BOR) 642 services to instantiate the parameters and variables necessary for sending an operation for execution in application platform 628. The parameters and variables are identified as data types and data structures, and then could be mapped to the process context of the corresponding application service. Workflow engine 604 accesses various business objects provided at application platform 628 and stored in BOR 642 via BO adapter 622.

Extension platform 602 utilizes the software logistics infrastructure of application platform 628 to deploy and manage the software components to be executed by the hosted application services. The runtime formats of the process definitions for the application services hosted in extension platform 602, are stored in process repository 646. Workflow engine 604 accesses process repository 646 to extract relevant executable instructions via process layer (PL) adapter 624. Extension layer (EL) adapter 644 in application platform 628 could be required to adapt process repository 646 to extension platform 602. Process repository 646 stores compiled process definitions persisted in process content 648. Versioning and changes to the process definitions could be organized and transported within change and transport system (CTS) 650 tool provided. Extension platform 602 could access process content 648 and CTS 650 resources via PL adapter 624.

Comparing FIG. 6 with FIG. 5, the versioned process content (e.g., Trigger Networks and other process model artifacts like task definitions, texts, data types, mapping definitions, etc.) is handled by process repository 646 which acts as a central deployment hub and administration interface. Process repository 646 passes any content from process content 648 (e.g., after a new deployment or after a content transport via CTS 650) to workflow engine 604. Then, workflow engine 604 distributes the content to the respective adapters which, in turn, contact the corresponding resources to deploy the respective content fragments. Additionally, some resources provided at application platform 628 may receive process definitions for deployment from process repository 646, directly.

In an alternative embodiment of the invention, workflow engine 604 does neither natively execute the underlying process models of the running application services, nor any other flow-oriented paradigm, e.g., business process execution language (BPEL), event-driven process chain (EPC), unified modeling language (UML) statecharts, etc. Instead, workflow engine 604 provides for a reduced instruction set computer (RISC)-like approach, essentially executing "event-condition-action" (ECA) rules with transactional guarantees. Those rules consist of a condition part, that is a first order predicate atop typed state variables, and an action part, that is a plain script triggering updates on state variables and performing callbacks into connected adapters 608 to 624. Process models need to be compiled into a set of ECA rules which implement the execution semantics of the corresponding model components. Workflow engine 604 processes rules whenever triggered by state variable changes. That is, adapters 608 to 624 may both provide events (e.g., state variable changes) to workflow engine 604, or be called from within rule actions running in workflow engine 604. Adapters 608 to 624 are supposed to keep the state of the corresponding resources "in sync" with the state of workflow engine 604.

Throughout its lifetime, a business process executed by workflow engine 604 constantly and bi-directionally interacts with its environment through adapters 608 to 624. Workflow engine 604 splits the processes into asynchronously executed rules where each rule action constitutes a separate main memory transaction that is optionally synchronized with an actual database transaction. Whenever exchanging data with its environment, a business process rule needs to synchronize the respective transactions. Generally, a proper synchronous transactional coupling is an expensive operation that negatively affects the process performance by increasing runtime latencies for single rule executions. For this reason, an asynchronous reliable communication between executed rule and the corresponding resource is established via "async-sync" bridge.

Figure 7:
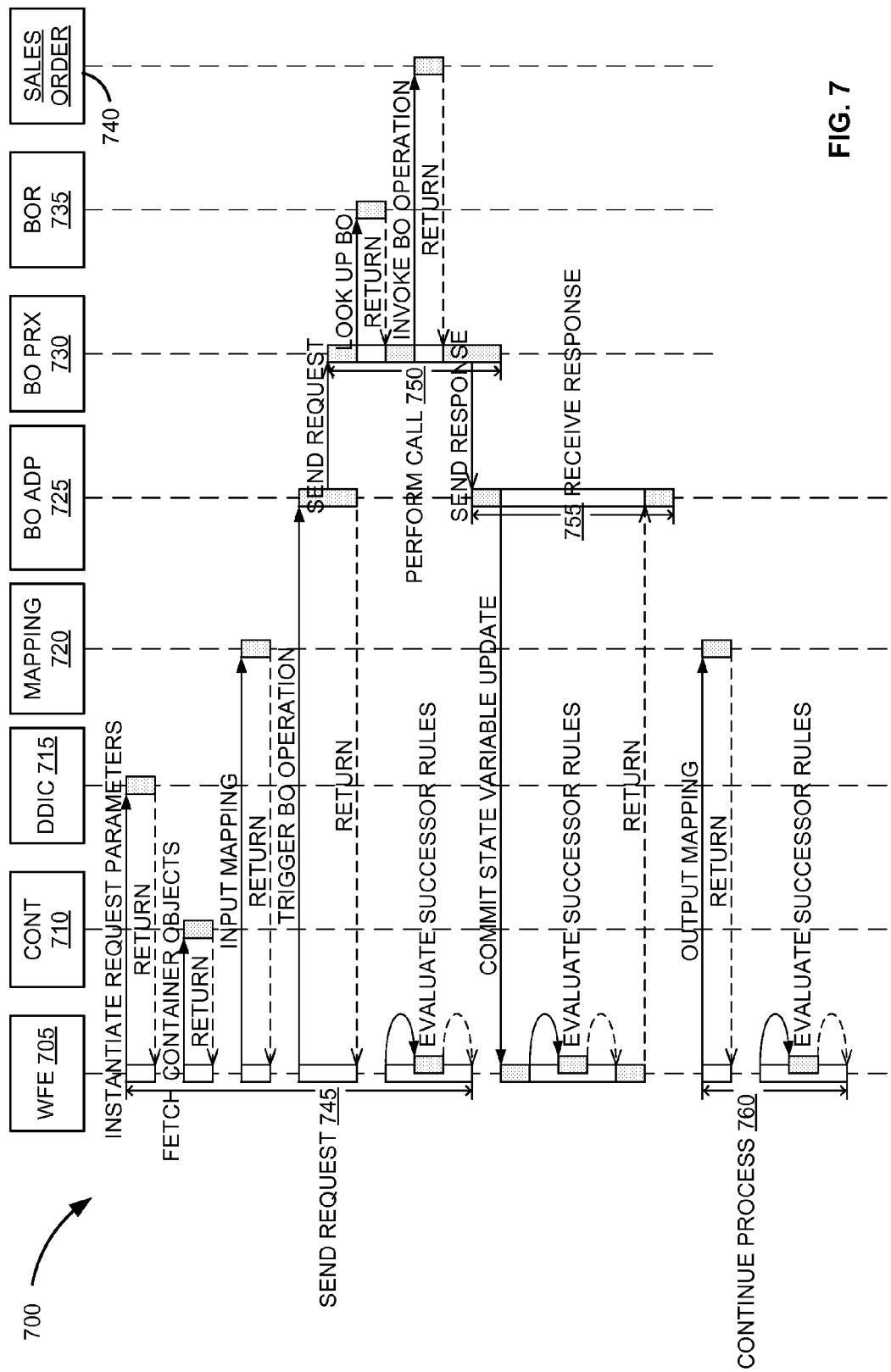
FIG. 7 is a block diagram illustrating a process for executing an exemplary operation by an extension application platform coupled to an application platform, according to one embodiment of the invention.

FIG. 7 illustrates process 700 for implementing the "async-sync" bridge approach to executing an exemplary task of a software service hosted in an extension platform coupled to application platform. Process 700 shows the boundaries of the involved transactions for invoking synchronous business object (BO) operations. The transactions are "send request" 745, "perform call" 750, "receive response" 755 and "continue process" 760. Transactions "send request" 745 and "continue process" 760 correspond to workflow engine 705 rule actions. Transactions "send request" 745, "receive response" 755 and "continue process" 760 change workflow engine 705 state variables, and require evaluation of potential follow-up rule conditions.

Initially, transaction "send request" 745 prepares call parameters by instantiating them through data dictionary (DDIC) adapter 715, fetching the respective container objects through container (CONT) adapter 710, and by input mapping the parameters from the process context through mapping adapter 720. Once the call parameters are prepared, the BO operation is triggered through BO adapter (BO ADP) 725. Transaction "perform call" 750 issues a call asynchronously to BO proxy component 730. When that call is received, BO proxy component 730 performs the operation on BO 740 (e.g., "sales order") within the same transaction. BO 740 is identified and locked for exclusive access at BO repository (BOR) 735. Transaction "perform call" 750 asynchronously calls back BO adapter 725. The response document is handled by transaction "receive response" 755 that performs the state variable change to enable a successor rule "continue process" 760. The successor rule "continue process" 760 could run in a separate transaction where the output mapping from the response to the process context through mapping adapter 720 is performed.

In effect, the "async-sync" bridge approach caters for an improved throughput on the extension platform side where execution is not blocked while potentially long-running BO operations are performed. At the same time, the application service execution state (e.g., local context and task progress positions) is kept in sync with the external resources state (e.g., corresponding business objects state). This is due to the fact that (1) all asynchronous communication happens reliably though inter-process communication protocols, (2) the application service's execution is resumed only when a matching response has arrived, (3) the workflow engine 705 and the business object 740 states are disjoint, and (4) the BO Proxy component 730 receives the request, performs the call, and returns the response in the same transaction.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices;

magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
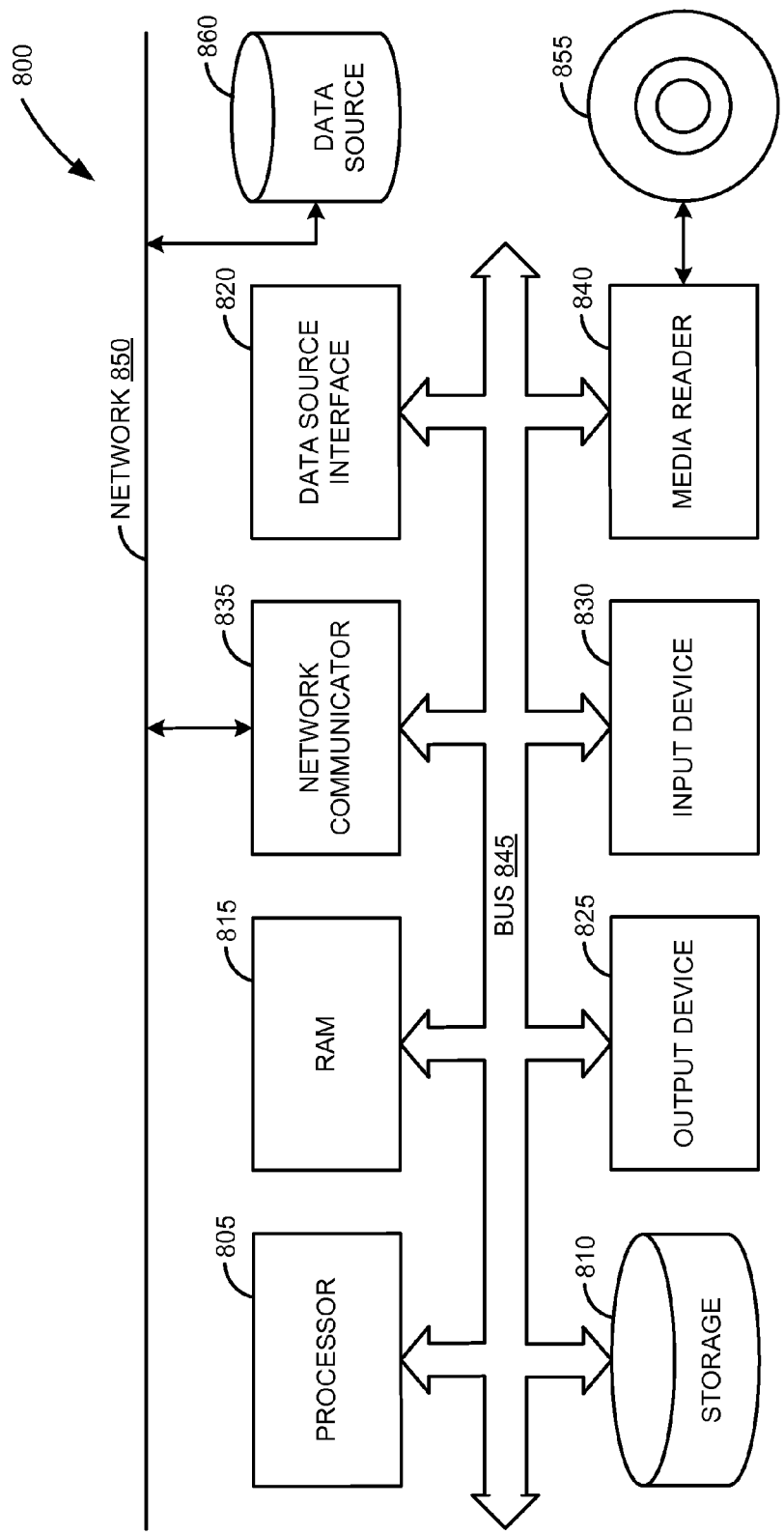
FIG. 8 is a block diagram of an exemplary computer system to execute computer readable instructions to provide additional application services, according to one embodiment of the invention.

FIG. 8 is a block diagram of an exemplary computer system 800. The computer system 800 includes a processor 805 that executes software instructions or code stored on a computer readable medium 855 to perform the above-illustrated methods of the invention. The computer system 800 includes a media reader 840 to read the instructions from the computer readable medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer system coupling computer application platforms to introduce additional application services, the system comprising:
    a processor; and
    a memory coupled to the processor and storing instructions, which when executed from the memory, cause the processor to:
    run a first process of an operation system and a second process of the operation system, wherein the first process of the operation system is separate from the second process of the operation system,
    run an application platform within the first process of the operation system to provide at least one resource selected from an application and an infrastructure service hosted by the application platform,
    run an extension platform in the second process of the operation system to host at least one application service to execute a business process,
    in the second process, instantiate a resource adapter to intercept a service request at the extension platform, and to route the intercepted service request to the at least one resource provided by the application platform for execution, wherein the execution of the intercepted service request at the at least one resource provided by the application platform changes a status of the business process executed at the at least one application service hosted by the extension platform,
    expose at least one interface to enable remote administration of the at least one application service hosted by the extension platform, wherein the administration is performed from the application platform,
    wherein generate a design of an application service in the software component model at the extension platform by utilizing artifacts of the application platform, wherein the application service to execute a business process, wherein store content of the design of the application service to a process, wherein store content of the design of the application service to a process content storage at the application platform, wherein the design of the application service includes one or more process definitions, and wherein activate the design of the application service at the extension platform, using a software logistics mechanism provided at the application platform, to execute the one or more process definitions of the component design to provide the application service.

2. The system of claim 1, wherein the extension platform comprises:

a basic installation, in the second process of the operation system, of an application server; and a software component model to design and execute the at least one application service.

3. The system of claim 1, wherein instantiating the resource adapter comprises:

generating an abstraction layer to provide access to the at least one resource provided by the application platform.

4. The system of claim 1, wherein the memory further comprises:

an inter-process communication protocol to carry a data transfer between the application platform run by the processor within the first process of the operation system and the extension platform run by the processor within the second process of the operation system.

5. The system of claim 1, wherein the memory further comprises:

a distributed transaction mechanism to synchronize a state of the extension platform run by the processor within the second process of the operation system, with a state of the at least one resource provided by the application platform run by the processor within the first process of the operation system.

6. A non-transitory computer readable medium having instructions stored thereon which when executed by a processor cause a computer to:

run a first process of an operation system and a second process of the operation system, wherein the first process of the operation system is separate from the second process of the operation system;

within the second process of the operation system, run an application platform to provide at least one resource selected from an application and an infrastructure service hosted by the application platform;

within the first process of the operation system, implement an extension platform including a software component model for business process modeling;

in the first process, instantiate a resource adapter to provide the extension platform with access to the at least one resource provided at the application platform;

generate a design of an application service in the software component model at the extension platform by utilizing artifacts of the application platform, wherein the application service to execute a business process;

store content of the design of the application service to a process content storage at the application platform, wherein the design of the application service includes one or more process definitions; and activate the design of the application service at the extension platform, using a software logistics mechanism provided at the application platform, to execute the one or more process definitions of the component design to provide the application service, and wherein the resource adapter to intercept a service request at the extension platform and to route the intercepted service request to the at least one resource provided by the application platform for execution to change a status of the business process.

7. The computer readable medium of claim 6, wherein instantiating the resource adapter comprises:

generating an abstraction layer to provide access to the at least one resource provided at the application platform.

8. The computer readable medium of claim 6, further comprising computer readable instructions stored thereon which when executed by a processor cause a computer environment to:

modify the software component model at the extension platform in accordance with a programming model of the application platform to support at least one process definition from the at least one resource of the application platform.

9. The computer readable medium of claim 6, further comprising computer readable instructions stored thereon which when executed by a processor cause a computer environment to:

extract an existing process definition from the process content storage at the application platform to the software component model at the extension platform.

10. The computer readable medium of claim 6, further comprising computer readable instructions stored thereon which when executed by a processor cause a computer environment to:

at the extension platform, compile a process definition of the design of the application service from the process content storage at the application platform, wherein the process definition is compiled into an executable format to activate the application service at the extension platform; and save the compiled executable format of the process definition in a repository at the application platform.

11. The computer readable medium of claim 10, further comprising computer readable instructions stored thereon which when executed by a processor cause a computer environment to:

store the design of the application service and the compiled executable format in the repository.

12. The computer readable medium of claim 10, further comprising computer readable instructions stored thereon which when executed by a processor cause a computer environment to:

extract the compiled executable format of the process definition from the repository; and send the compiled executable format of the process definition to the at least one resource of the application platform for deployment at the extension platform.

13. A computer implemented method for coupling computer application platforms to introduce additional application services, the method comprising:

running a first process of an operation system and a second process of the operation system, wherein the first process of the operation system is separate from the second process of the operation system;

within the second process of the operation system, running an application platform to provide at least one resource selected from an application and an infrastructure service;

within the first process of the operation system, running an extension platform to host an application service and instantiating a resource adapter to access the at least one resource provided by the application platform;

at the extension platform, receiving a service request for the application service hosted by the extension platform;

at the extension platform, intercepting the service request by the resource adapter;

in response to intercepting the service request, sending an execution call for the service request via the resource adapter to the at least one resource provided by the application platform;

receiving a result, at the extension platform, of the execution of the service request at the at least one resource provided by the application platform;

updating an execution status of a business process underlying the application service hosted by the extension platform based on the result of the execution of the service request at the application platform;

wherein generate a design of an application service in the software component model at the extension platform by utilizing artifacts of the application platform, wherein the application service to execute a business process;

wherein store content of the design of the application service to a process content storage at the application platform, wherein the design of the application service includes one or more process definitions; and wherein activate the design of the application service at the extension platform, using a software logistics mechanism provided at the application platform, to execute the one or more process definitions of the component design to provide the application service.

14. The method of claim 13 further comprising:
exposing the application service hosted by the extension platform implemented in the first process of the operation system for management and administration from the application platform running in the second process of the operation system via an interface using an inter-process communication protocol.

15. The method of claim 13, wherein receiving the service request for the application service comprises:
identifying an event for a change in the execution status of the business process underlying the application service hosted by the extension platform;

extracting an operation parameter from a process context corresponding to an execution status of the application service hosted by the extension platform, wherein the process context is stored in a runtime repository at the application platform; and generating a task at the application service hosted by the extension platform in response to the event and based on the operation parameter, the task including the service request.

16. The method of claim 15, wherein extracting the operation parameter comprises:
instantiating a container structure of the operation parameter in the extension platform; and mapping process context data stored in the runtime repository at the application platform to the container structure of the operation parameter.

17. The method of claim 13, wherein sending the execution call for the service request comprises:
invoking, from the extension platform, an execution of the service request at the at least one resource, provided by the application platform, via the resource adapter using an inter-process communication protocol.

18. The method of claim 13, wherein receiving the result of the execution of the service request comprises:
receive, at the extension platform, a response to the execution call via the resource adapter from from the at least one resource provided by the application platform.

19. The method of claim 18 further comprising:
based on the received response, committing the execution of the service request or triggering a rollback of the execution of the service request.

20. The method of claim 13, wherein updating the execution status of the business process underlying the application service further comprises:
synchronizing the result of the execution of the service request with a process context stored in a repository at the application platform, wherein the process context corresponds to an execution status of business process underlying the application service hosted by the extension platform.

* * * * *